US006595660B2

(12) United States Patent
Spiro

(10) Patent No.: US 6,595,660 B2
(45) Date of Patent: Jul. 22, 2003

(54) SILICONE ADHESIVE FOR LAMP LENS ATTACHMENT

(75) Inventor: Clifford Lawrence Spiro, Willoughby Hills, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/818,440

(22) Filed: Mar. 27, 2001

(65) Prior Publication Data

US 2002/0141185 A1 Oct. 3, 2002

(51) Int. Cl.$^{7}$ ......................... F21V 31/00; C09J 183/00

(52) U.S. Cl. ....................... 362/267; 362/310; 362/329; 156/329

(58) Field of Search ................................ 156/291, 329; 313/113; 362/267, 158, 310, 329

(56) References Cited

U.S. PATENT DOCUMENTS

| | | | | | |
|---|---|---|---|---|---|
| 4,189,657 | A | | 2/1980 | Kimball, III et al. | 313/113 |
| 4,231,081 | A | | 10/1980 | Borruso | 362/548 |
| 4,305,015 | A | | 12/1981 | Honda et al. | 313/113 |
| 4,342,142 | A | | 8/1982 | Nieda et al. | 448/22 |
| 4,500,946 | A | | 2/1985 | Mikola | 362/226 |
| 4,538,090 | A | | 8/1985 | Wilhelm et al. | 313/578 |
| 4,546,017 | A | * | 10/1985 | Flackett et al. | 427/387 |
| 4,648,014 | A | | 3/1987 | Dick et al. | 362/346 |
| 4,802,068 | A | * | 1/1989 | Mokry | 362/267 |
| 5,113,321 | A | | 5/1992 | Suzuki | 362/538 |
| 5,254,901 | A | | 10/1993 | Haraden et al. | 313/113 |
| 5,488,547 | A | | 1/1996 | Hiraoka | 362/462 |
| 5,582,474 | A | | 12/1996 | Van Order et al. | 362/490 |
| 5,664,866 | A | | 9/1997 | Reniger et al. | 362/477 |
| 5,698,936 | A | * | 12/1997 | Marien et al. | 313/113 |
| 5,806,957 | A | * | 9/1998 | Prior et al. | 362/267 |
| 5,899,559 | A | | 5/1999 | Lachmayer et al. | 362/513 |
| 5,916,981 | A | * | 6/1999 | Cifuentes et al. | 156/329 |
| 6,056,416 | A | | 5/2000 | Ngai et al. | 362/225 |
| 6,248,403 | B1 | * | 6/2001 | Weir et al. | 156/329 |

* cited by examiner

*Primary Examiner*—Alan Cariaso
(74) *Attorney, Agent, or Firm*—Pearne & Gordon LLP

(57) ABSTRACT

A reflector lamp is provided in which the lens is secured to the reflector by use of an addition-cure silicone adhesive.

15 Claims, 1 Drawing Sheet

SILICONE ADHESIVE FOR LAMP LENS ATTACHMENT

FIELD OF THE INVENTION

The invention relates to lamps, more specifically reflector lamps with lenses.

BACKGROUND OF THE INVENTION

Lenses are glued to reflectors in many reflector lamp configurations such as halogen and discharge lamps. Epoxy adhesives are typically employed to fix the lenses in place. Epoxies, however, have many limitations. Epoxies have limited life at elevated temperatures. They are relatively expensive, they discolor, and they are subject to both ozonolysis and radiative degradation. Among reflector lamps using epoxy adhesives to affix the lens, a substantial number of lenses have been reported to have fallen off of their lamps due to slow decay of epoxy strength and adhesion over time. Furthermore, epoxy adhesives become brittle upon cure, and embrittlement is exacerbated over time and through exposure to high temperatures during use.

Condensation-cure silicone adhesives have been used as a substitute for epoxy adhesives, but these adhesives generally have low green strength and low cured strength. Furthermore, condensation-cure silicone adhesives require long cure times and may produce corrosive byproducts during cure. Condensation-cure silicone adhesives also usually produce gaseous byproducts, which can result in gas bubbles being trapped in the adhesive layer, impairing the adhesive strength. It would be advantageous to utilize an adhesive for reflector lamps not subject to the limitations of epoxy and condensation-cure silicone adhesives.

SUMMARY OF THE INVENTION

A lamp comprises a reflector and a lens. The lens is secured to the reflector by an addition-cure silicone adhesive.

DETAILED DESCRIPTION OF THE PREFERRED EMBODIMENTS OF THE INVENTION

In the description that follows, when a preferred range, such as 5 to 25, is given, this means preferably at least 5, and separately and independently, preferably not more than 25.

The present invention relates generally to lamps, and particularly to reflector lamps. The illustrated embodiment is a reflector lamp compatible with standard lighting fixtures, but other types of lamps are within the scope of the present invention.

Figure 1:
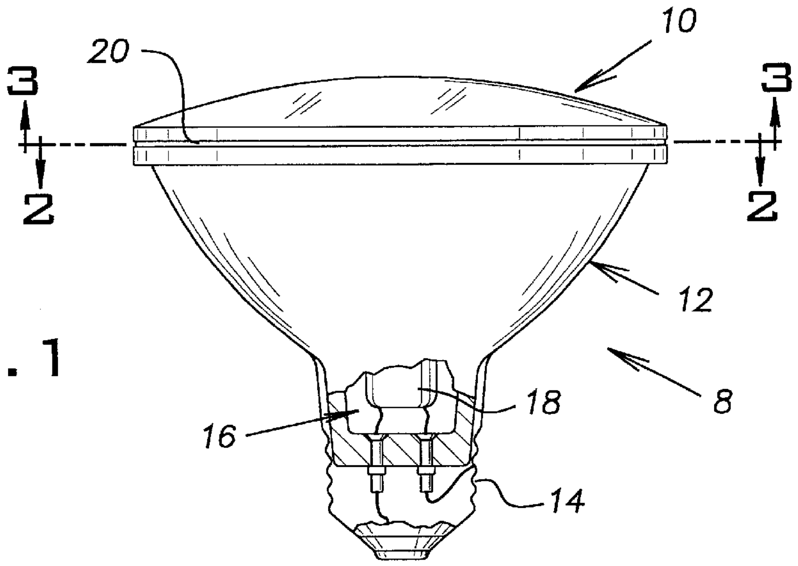
FIG. 1 is an elevational view of a reflector lamp, partially cut away to show inner components of the lamp.

Referring to FIG. 1, the lamp 8 has a lens 10, typically made of glass, secured to a reflector 12 by adhesive 20. The reflector is typically aluminum-covered glass, but may also be silver. The lamp also includes a threaded base 14, and a lighting means 16. In this case, the lighting means is a lamp capsule 18, which may be a standard tungsten halogen lamp capsule or an arc lamp capsule.

Figure 2:
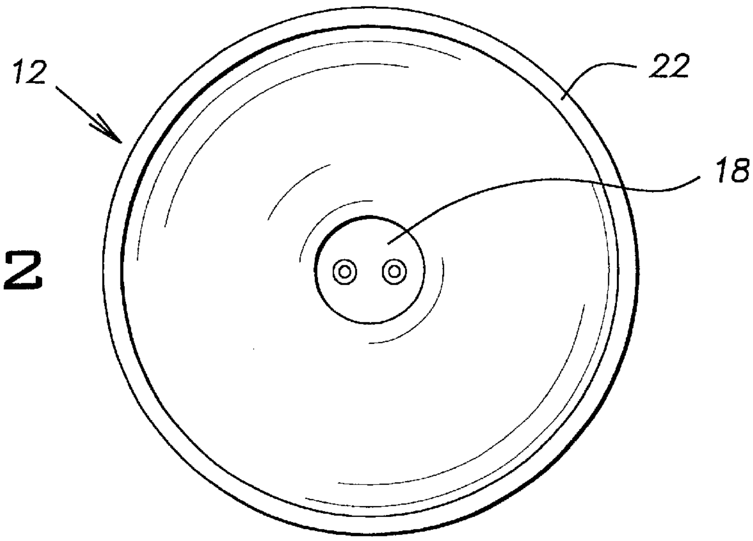
FIG. 2 is a view of the reflector lamp taken from line 2—2 of FIG. 1.

Referring to FIG. 2, the lamp capsule 18 is visible in the center of the reflector 12, as is a flange 22. The flange extends around the periphery of the reflector and is substantially flat, although notches or grooves may be formed on the flange to assist secure seating of the lens. The outer diameter of the flange in commercially sold lamps for home use is generally between 5.1 cm (2 in.) and 12.1 cm (4.75 in.). Lamps for automotive, aircraft, stage, studio and other uses may be much larger. Such commercially sold lamps are known in the art.

Figure 3:
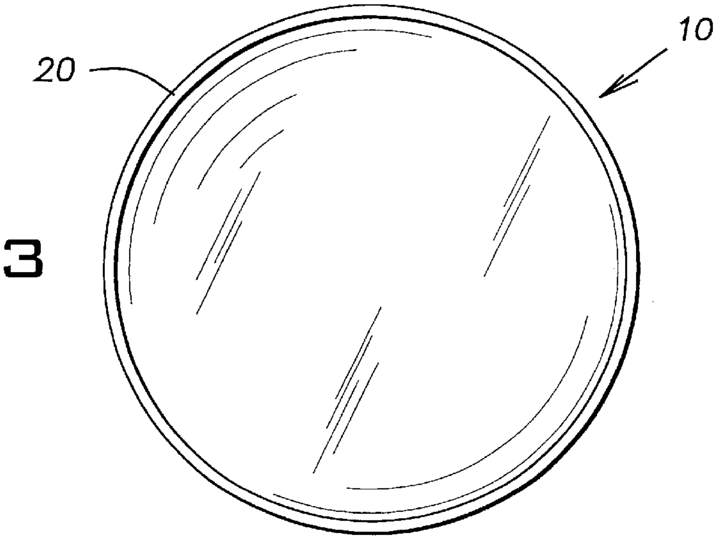
FIG. 3 is a view of the lens taken from line 3—3 of FIG. 1.

Referring to FIG. 3, the lens can be seen to have a lip 21 that extends around the lens periphery. The lip is sized to match the flange 22 on the reflector. Notches or grooves may also be formed on the lens, complementary to the flanges or grooves on the flange, to assist seating of the lens.

During manufacture of a reflector lamp, the lamp typically is pre-assembled without the lens and is then carried along a conveyor to a station where a metered amount of adhesive is applied to the reflector's flange. In the alternative, a metered amount of adhesive may be applied to the lip of the lens, or adhesive may be applied to both the reflector and the lens. The lens and reflector are then pressed together. The adhesive should have sufficient green strength to effectively secure the lens to the reflector during assembly, although it may be desirable to weight or clamp the lamp to ensure that the lens is retained in position prior to adhesive cure. While adhesion promoters or primers may be applied to either the lens or reflector surface, it is possible to apply the adhesive directly to the lens or reflector without first applying such coatings.

Preferably an addition-cure silicone adhesive or silicone rubber adhesive is applied to either the reflector or the lens, and the lamp is assembled with the lens abutting the reflector. Addition-cure silicone adhesives are commonly available as either two-part addition-cure adhesives, in which two components are mixed shortly before application, or one-part addition-cure adhesives, in which all components are pre-mixed together, typically along with an inhibitor to prevent curing before application of the adhesive. The inhibitor is typically heat-inactivatable. The addition-cure silicone adhesive (hereinafter Adhesive) is preferably a room-temperature curing adhesive, that is, capable of curing at room temperature (preferably about 68–72° F.), such as an RTV adhesive. The Adhesive also preferably can be cured in a short time at an elevated temperature such as 150° C. to 200° C. Preferably a cure time of about 1.5 to 2.5 or about 2 minutes at this temperature range can be achieved, as it is desirable to pass the assembled lamps through an oven on a conveyor. Less preferably the Adhesive will cure in about 1 to 5 minutes in an oven at this temperature range, less preferably in about 1 to 10 minutes, less preferably in less than about 20 minutes, less preferably in less than about 60 minutes.

The Adhesive preferably produces few or substantially no byproducts during cure, and preferably has a volatility of less than about 0.2 weight percent, more preferably less than about 0.1 weight percent. The Adhesive is preferably a platinum-catalyzed addition-cure silicone adhesive, which vulcanizes by anti-Markovnikov addition about a vinyl group and a hydride bond. The Adhesive may be a two-part composition, in which case the components are mixed shortly before application, or a one-part composition containing all components of the adhesive as well as a vulcanization inhibitor, typically a heat-inactivatable inhibitor.

The Adhesive preferably is flexible, reducing the likelihood of cohesive failure due to differing coefficients of thermal expansion between the adhesive and the reflector and the lens. The Adhesive preferably has an elongation at break of about 100% to 1000%, more preferably of about 300% to 400%.

The Adhesive preferably is substantially transparent and colorless once cured, and preferably retains a substantially & transparent and colorless appearance throughout the service life of the lamp.

One adhesive suitable for use is available from General Electric Silicones, Waterford, N.Y., under the name RTV658 low volatile silicone adhesive sealant. Other addition-cure silicone adhesives are known in the art.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A lamp comprising a reflector and a lens secured to the reflector, wherein the lens is secured to the reflector by an addition-cure silicone adhesive, the adhesive having a volatility of less than about 0.2 weight percent before cure, said adhesive producing substantially no byproducts while curing, the cured adhesive having substantially no gas bubbles trapped in the adhesive, whereby the relative position of the lens with respect to the reflector is maintained.

2. A lamp according to claim 1, wherein the adhesive is a room-temperature curing adhesive.

3. A lamp according to claim 1, wherein the adhesive is a one-part addition cured silicone adhesive.

4. A lamp according to claim 1, wherein the adhesive is a two-part addition cured silicone adhesive.

5. A lamp according to claim 1, wherein the adhesive is capable of being substantially cured in less than about 20 minutes by heating the lamp in an oven at a temperature of at least about 150° C.

6. A lamp according to claim 1, wherein the adhesive is capable of being substantially cured in less than about 10 minutes by heating the lamp in an oven at a temperature of at least about 150° C.

7. A lamp according to claim 1, wherein the adhesive is capable of being substantially cured in less than about 5 minutes by heating the lamp in an oven at a temperature of at least about 150° C.

8. A lamp according to claim 1, wherein the adhesive, upon curing, has an elongation at break of about 100% to 1000%.

9. A lamp according to claim 1, wherein the adhesive, upon curing, has an elongation at break of about 300% to 400%.

10. A lamp according to claim 1, wherein the adhesive is in direct contact with the lens.

11. A lamp according to claim 1, wherein the adhesive is in direct contact with the reflector.

12. A lamp according to claim 1, wherein the adhesive has sufficient green strength to effectively secure the lens to the reflector during assembly.

13. A lamp according to claim 1, wherein the adhesive has a volatility of less than about 0.1 weight percent before cure.

14. A lamp according to claim 1, wherein the cured adhesive is substantially transparent and colorless.

15. A lamp according to claim 14, wherein the adhesive remains substantially transparent and colorless throughout the service life of the lamp.

* * * * *